July 10, 1934.  O. E. ODLAND  1,965,780
BOX MAKING FRAME
Filed May 1, 1933
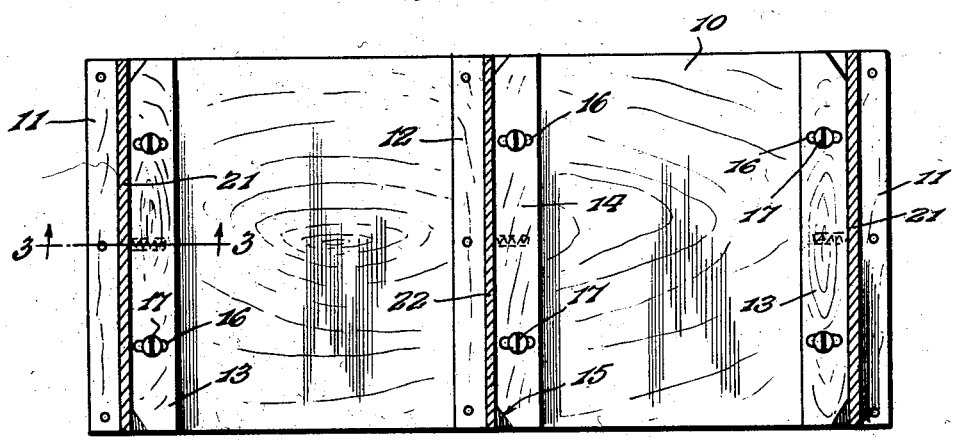
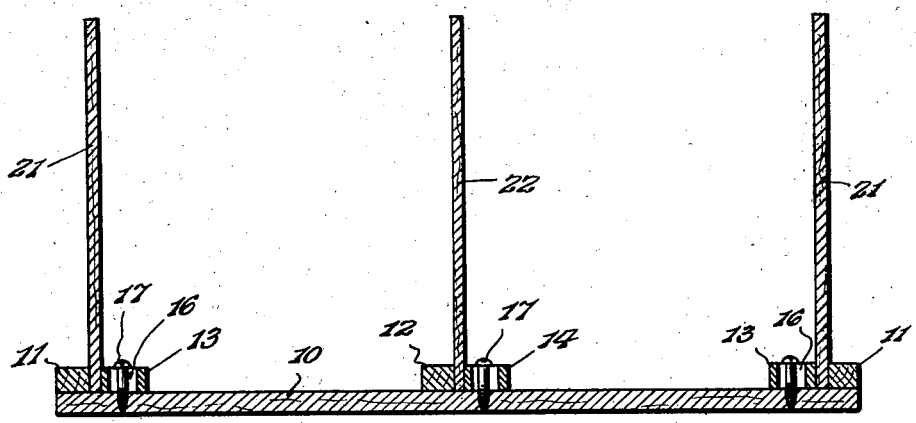
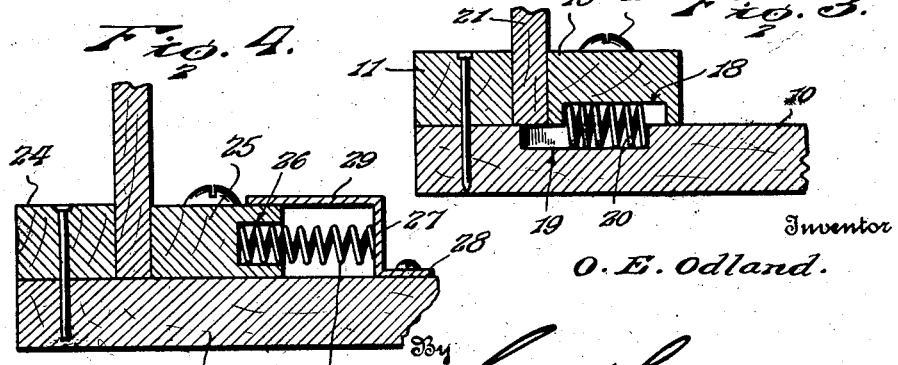
Inventor
O. E. Odland.
By Lacey & Lacey,
Attorneys Patented July 10, 1934

1,965,780

UNITED STATES PATENT OFFICE 1,965,780

BOX-MAKING FRAME

Oluf E. Odland, Flaxton, N. Dak.

Application May 1, 1933, Serial No. 668,863

2 Claims. (Cl. 144—295)

This invention relates to an improved box-making frame and seeks, among other objects, to provide a device of this character particularly adapted for making egg cases.

The invention seeks, as a further object, to provide a device adapted to hold the ends and center partition of an egg case and which may be readily turned on edge so that after the bottom has been nailed to the ends and center partition, first one side and then the other side of the egg case may be conveniently nailed on.

And the invention seeks, as a still further object, to provide a device embodying clamping bars for holding the ends and center partition mentioned and wherein said bars will be so formed that said ends as well as the center partition may be inserted between the clamping bars and the stop cleats employed from the ends of the bars, thus avoiding the necessity of manually retracting the bars to position the ends and center partition in place on the frame.

With the foregoing and other objects in view, the invention consists in certain novel details of construction and combinations of parts hereinafter fully described and claimed.

In the accompanying drawing, Figure 1 is a plan view of my improved frame showing the ends and center partition of a conventional egg case in position thereon, Fig. 2 is a vertical longitudinal sectional view through the frame, Fig. 3 is a detail section on the line 3—3 of Fig. 1 and particularly showing the mounting of the actuating springs for the clamping bars employed, and Fig. 4 is a detail section showing a slight variation of the invention.

In carrying the invention into effect, I employ a flat oblong base 10 of proper dimensions. This base is preferably of wood, although other suitable material may be employed, and nailed or otherwise fixed to the ends of the base, on its upper side, are transverse stops or cleats 11 extending from edge to edge of the base. The cleats 11 lie flush with the end edges of the base, as particularly seen in Fig. 2, and nailed or otherwise fixed to the upper side of the base at a proper point between the end cleats 11, is a center cleat 12 like the former cleats. The cleats 11 and 12 extend parallel to each other and, as will be appreciated, serve to brace and reinforce the base 10.

Slidably mounted upon the base 10 to coact with the end cleats 11 are clamping bars 13 and similarly mounted to coact with the center cleat 12 is a like clamping bar 14. These bars are beveled at their forward corners, as indicated at 15, and formed in the bars, at longitudinally spaced points, are transversely extending slots 16 through which freely extend screws 17 or other approved fastening devices slidably connecting the bars with the base. Formed in each of the clamping bars 13 on its lower side, as well as in the clamping bar 14, as particularly seen in Fig. 3, a transversely extending semi-cylindrical recess 18 and formed in the upper side of the base 10 is a mating semi-cylindrical recess 19. Disposed in each pair of mating recesses 18 and 19 is a coil spring 20 one end of which bears against the forward end wall of the recess 18 while the opposite end of the spring bears against the rear end wall of the recess 19. Thus, as will be perceived, the springs 20 will serve to push the clamping bars 13 toward the cleats 11, as well as also push the clamping bar 14 toward the cleat 12. As will be observed, the springs 20 are preferably located midway between the slots 16 of the clamping bars and by housing the springs between the clamping bars and the base, accidental injury to said springs, in the practical use of the frame, will be avoided.

In use, the ends of an egg case, as conventionally illustrated at 21, are first arranged in inverted position between the cleats 11 and the clamping bars 13 and then the center partition of the egg case, conventionally illustrated at 22, is arranged in inverted position between the cleat 12 and clamping bar 14. As will be observed, the base 10 is of a width corresponding to the width of the ends 21 and center partition 22 so as to lie flush with the side edges thereof. Furthermore, as will be observed upon particular reference to Fig. 3, the forward end walls of the recesses 19 are located short of the confronting edges of the cleats 11 and 12. Consequently, when the clamping bars 13 and 14 are pushed to the limit of their forward movement by the springs 20, the forward ends of the springs will engage said end walls so that some space will remain between the clamping bars and the cleats. Accordingly, the lower corners of the ends 21 and center partition 22, at corresponding vertical edges thereof, may be inserted in said spaces from either the right or left, when said corners of the ends and center partition will coact with the beveled edges 15 of the clamping bars for pushing the clamping bars back away from the cleats so that the ends and center partition may be slid into place between the clamping bars and cleats without the necessity of manually retracting the clamping bars.

When the ends 21 of the egg case and center partition 22 thereof are in place upon the base, as shown in Figs. 1 and 2 of the drawing, the clamping bars 13 and 14 will then coact with the adjacent margins of said ends and center partition for tightly clamping these parts of the egg case in position on the base. Accordingly, the bottom of the egg case may be readily nailed to the upper edges of the ends and center partition. The base 10 may then be turned on one longitudinal edge when one side of the egg case may be nailed to the ends 21 and center partition 22, when, by turning the base on its opposite longitudinal edge, the other side of the egg case may be readily nailed in place. By then returning the base 10 to its normal position lying flat upon the floor, as shown in Figs. 1 and 2 of the drawing, the finished egg case may simply be lifted upwardly and thus readily detached from the frame. I accordingly provide a particularly effective device for the purpose set forth and, as will now be appreciated, a device characterized by structural simplicity.

In Fig. 4 of the drawing, I have shown a slight variation of the invention wherein the base is indicated at 23, one of the stop cleats at 24 and one of the clamping bars at 25. In this modification, the bar 25 is provided in its rear edge, at a point midway between the ends of the bar, with a socket 26 and mounted upon the base is an angle bracket 27 having a short end 28 screwed or otherwise fixed to the base, and an oppositely directed long end 29 which overhangs the bar 25 to slidably coact with the upper face thereof. Mounted beneath the long end 29 of the bracket is a coil spring 30, one end of which is seated in the socket 26 while the opposite end of the spring coacts with the bracket for urging the bar 25 forwardly toward the cleat 24. Otherwise, this variation of the invention is identical with the preferred construction and further description is accordingly believed unnecessary.

Having thus described the invention, I claim:

1. A box-making frame including a base, spaced transverse cleats secured on the upper side of the base, clamping bars resting directly upon the base adjacent respective cleats and similar to the cleats, means slidably connecting said bars with the base, means urging said bars forwardly to coact with said cleats for clamping lower edges of box members between the bars and cleats, and means to limit movement of the bars toward the cleats whereby to maintain spaced relation between the bars and cleats, the bars being beveled at their forward corners to admit edge portions of the box members to the spaces between the bars and cleats at the edge of the base.

2. A box-making frame including a base, cleats secured on the upper side of the base, clamping bars slidably resting upon the upper side of the base adjacent the respective cleats and similar to the cleats, means retaining the bars upon the base and limiting the sliding movement thereof, the base being provided with recesses in its upper side below the bars and the bars being provided in their lower sides with recesses mating with said recesses in the base, and expansion springs disposed in said recesses and each bearing at one end against the end of the recess in the base more remote from the corresponding cleat and at the opposite end upon the opposed end of the recess in the bar to urge the bar toward the cleat, the recess in the base terminating in spaced relation to the cleat whereby to maintain spaced relation between the cleat and the bar.

OLUF E. ODLAND. [L.S.]